(12) United States Patent  
Xia et al.

(10) Patent No.: US 9,097,615 B2  
(45) Date of Patent: Aug. 4, 2015

(54) FIBER SIGNAL LOSS EVENT IDENTIFICATION

(71) Applicant: Verizon Patent and Licensing Inc., Basking Ridge, NJ (US)

(72) Inventors: Tiejun J. Xia, Richardson, TX (US); Scott R. Kotrla, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 87 days.

(21) Appl. No.: 13/947,478

(22) Filed: Jul. 22, 2013

(65) Prior Publication Data

US 2015/0022803 A1 Jan. 22, 2015

(51) Int. Cl.  
*G01N 21/00* (2006.01)  
*G01M 11/00* (2006.01)

(52) U.S. Cl.  
CPC ................................ *G01M 11/3127* (2013.01)

(58) Field of Classification Search  
CPC .......... G01M 11/3145; G01M 11/335; G01M 11/33; G01M 11/3109; G01M 11/338  
USPC ....................................................... 356/73.1  
See application file for complete search history.

(56) References Cited

U.S. PATENT DOCUMENTS 5,155,439 A * 10/1992 Holmbo et al. ............... 324/534  
2003/0052256 A1 * 3/2003 Spirin et al. ............. 250/227.11

* cited by examiner

*Primary Examiner* — Tarifur Chowdhury  
*Assistant Examiner* — MD Rahman

(57) ABSTRACT

A system includes a wavelength tunable laser to provide a first optical pulse of a first wavelength and a second optical pulse of a second wavelength to an optical fiber, a reflection detector to determine a first fiber attenuation curve from the first reflected pulse and a second fiber attenuation curve from the second reflected pulse, and a discontinuous loss event analyzer to identify a discontinuous loss event at a discontinuous loss point in at least one of the first fiber attenuation curve and the second first fiber attenuation curve, determine a return loss slope based on a return loss at the discontinuous loss point for the first fiber attenuation curve and a return loss at the discontinuous loss point for the second first fiber attenuation curve, and determine whether the discontinuous loss event is a bad fiber bending event based on the return loss slope.

20 Claims, 8 Drawing Sheets

FIBER SIGNAL LOSS EVENT IDENTIFICATION

BACKGROUND INFORMATION

An optical time domain-reflectometer (OTDR) is an opto-electronic instrument that identifies characteristics of optical fibers. The OTDR sends pulses (i.e., optical signals) through the optical fiber that is being tested. The pulses pass every point in the fiber and will cause return pulses or reflections, known as Rayleigh backscattering, at each point/location based on local fiber characteristics. The time that each reflection is received by a receiver in the OTDR correlates to the location where each reflection happens.

OTDR measurements of the fiber reflections may be analyzed to determine whether there are discontinuities in different locations of the optical fibers. The strength of the return pulses may be integrated as a function of time. The OTDR may identify fiber signal attenuation and discontinuous loss events. Technicians may be deployed to locations along the optical fiber to fix the issues in the optical fiber.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for identifying discontinuous loss events in an optical fiber. Consistent with embodiments described herein, the systems and methods may determine whether a (fiber) discontinuous loss event in an optical fiber is a bad fiber bending event or a bad fiber splice event. The systems may use two or more wavelengths to measure OTDR curves for discontinuous loss events. For each identified discontinuous loss event, the systems may analyze the wavelength dependence of the loss at the event.

Consistent with embodiments, the loss at a discontinuous point in an optical fiber may be determined for two different wavelengths. A threshold may be determined for a slope between different wavelengths at a same location in the optical fiber and, if the slope is greater than the threshold, the systems may identify the discontinuous loss event as a bad fiber bending event. The system may identify discontinuous loss events for each loss discontinuous point at which the slope is greater than the threshold.

Figure 1:
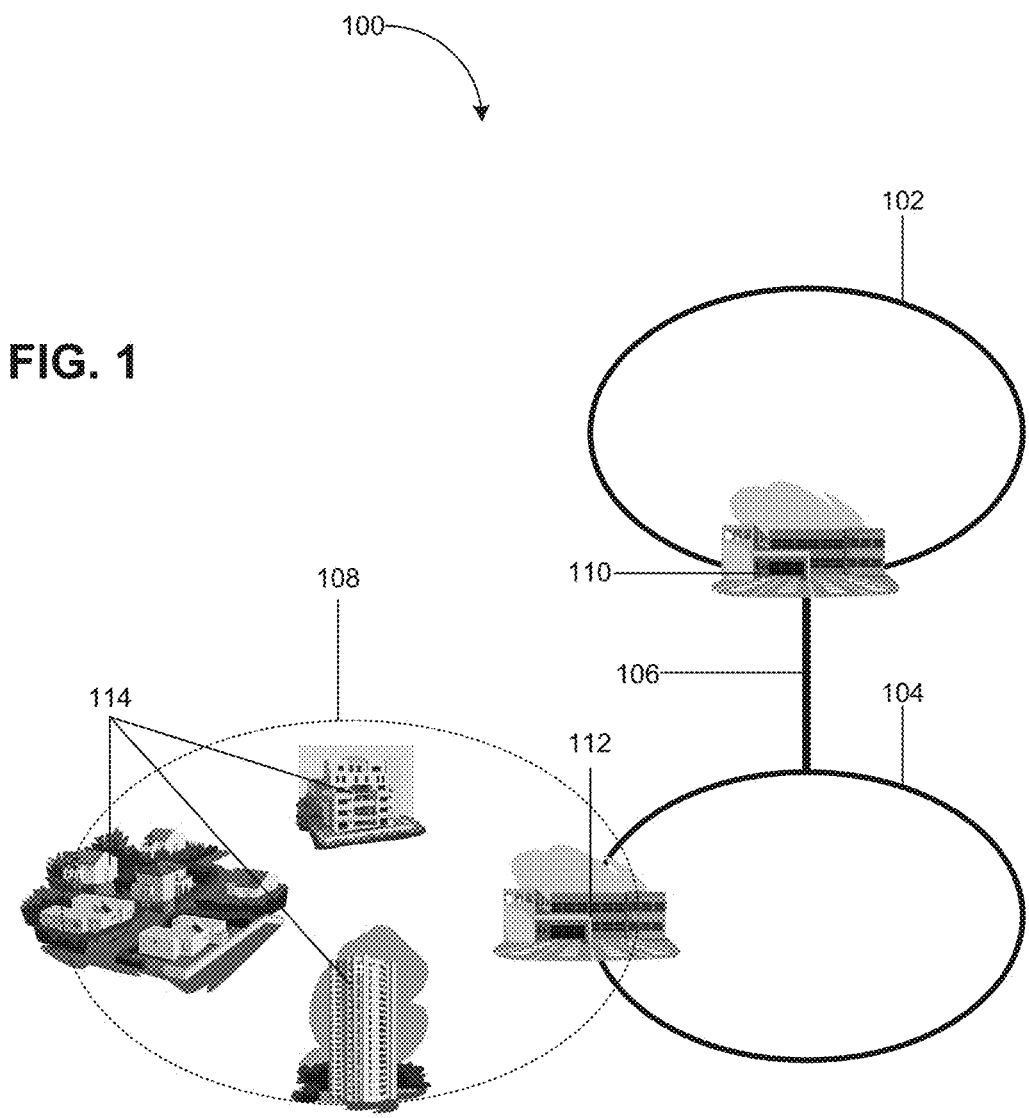
FIG. 1 illustrates an exemplary optical network in which concepts described herein may be implemented.

FIG. 1 shows an exemplary optical network 100 in which the concepts described herein may be implemented. As shown, optical network 100 may include metro/regional networks 102 and 104, long haul or ultra-long haul optical lines 106, and edge network 108. Depending on the implementation, optical network 100 may include additional, fewer, or different optical networks and optical lines than those illustrated in FIG. 1. For example, in one implementation, optical network 100 may include additional edge networks and/or metro/regional networks that are interconnected by Synchronous Optical Network (SONET) rings.

Metro/regional network 102 may include optical fibers and central office hubs that are interconnected by the optical fibers. The central office hubs, one of which is illustrated as central office hub 110, may include sites that house telecommunication equipment, including switches, optical line terminals, reconfigurable optical add-drop multiplexers (ROADMs), etc. In implementations described herein, central office hub may include a fiber signal loss identification device that may be used to detect issues in the optical fibers. In addition to being connected to other central offices, central office hub 110 may provide telecommunication services to subscribers, such as telephone service, access to the Internet, cable television programs, etc., via optical line terminals.

Metro/regional network 104 may include similar components as metro/regional network 102 and may operate similarly. In FIG. 1, metro/regional network 104 is illustrated as including central office hub 112, which may include similar components as central office hub 110 and may operate similarly.

Long haul optical lines 106 may include optical fibers that extend from metro/regional optical network 102 to metro/regional optical network 104. Edge network 108 may include optical networks that provide user access to metro/regional optical network 104. As shown in FIG. 1, edge network 108 may include access points 114 (e.g., office buildings, residential areas, etc.) via which end customers may obtain communication services from central office hub 112.

Figure 2:
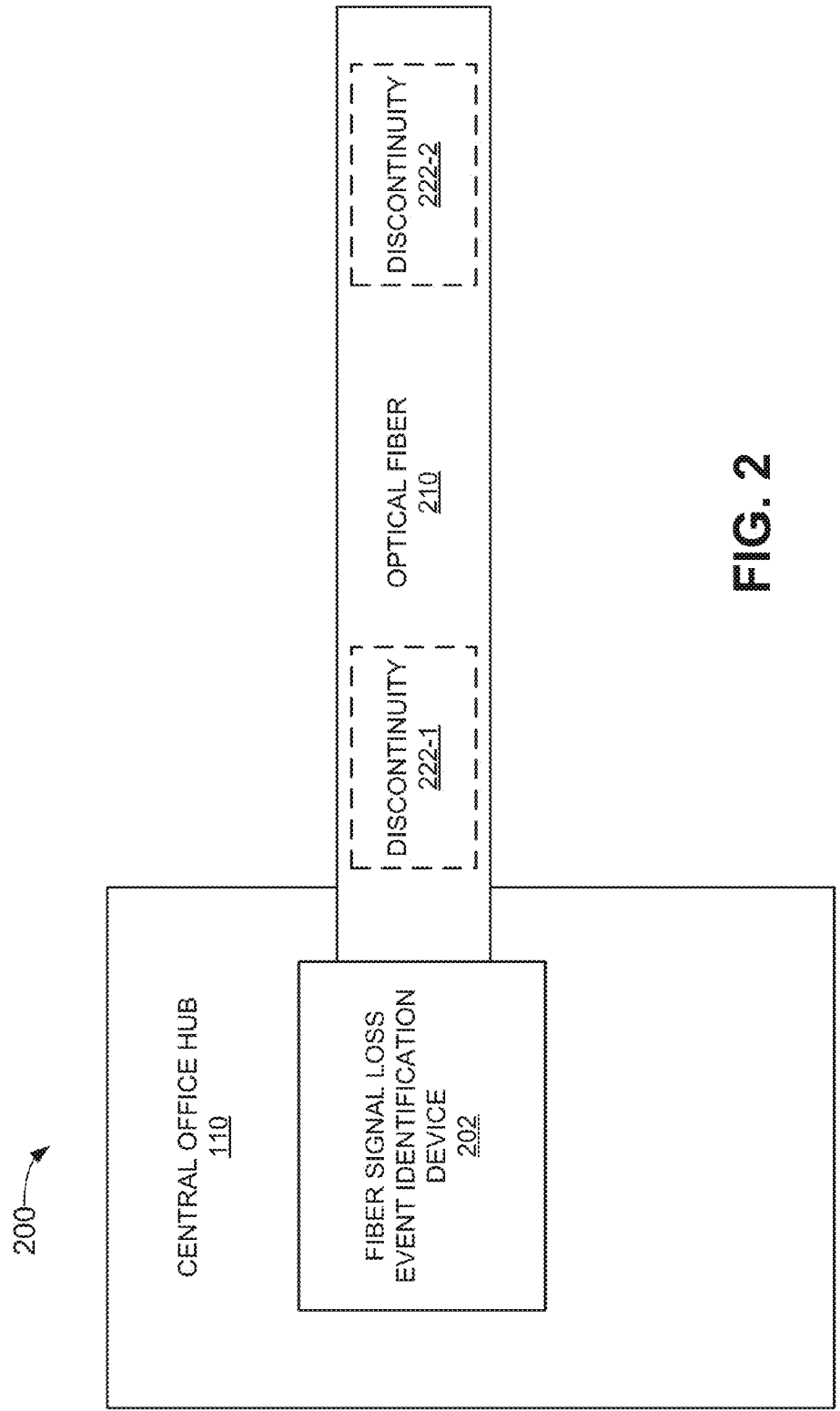
FIG. 2 is a diagram of the central office hub of FIG. 1, including a fiber signal loss event identification device.
Figure 3:
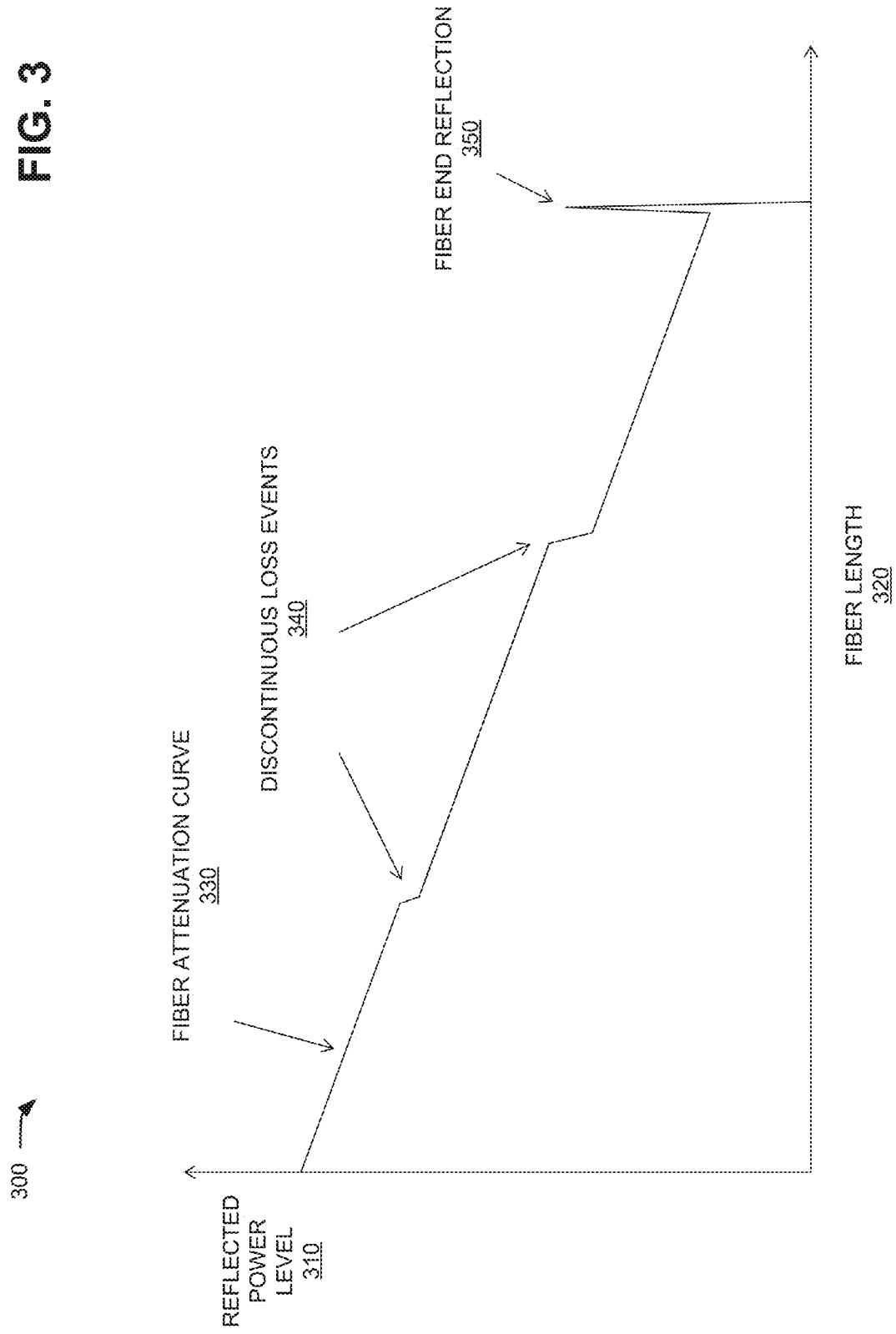
FIG. 3 illustrates an exemplary OTDR curve associated with an optical fiber including discontinuous loss events.

FIG. 2 is a diagram of the central office hub 110 of FIG. 1, including a fiber signal loss event identification device 210 according to one implementation. Fiber signal loss event identification device 210 may be positioned at the end of an optical fiber 220 in central office hub 110. Fiber signal loss event identification device 210 is described in conjunction with exemplary OTDR plot 300, which is shown in FIG. 3, and is associated with an optical fiber 220 that is experiencing discontinuous loss events.

As shown in FIG. 2, optical fiber 220 may include discontinuities 222 (shown in FIG. 2 as discontinuities 222-1 and 222-2) located in or along the optical fiber 220 that introduce discontinuous loss events to signals transmitted along optical fiber 220. Discontinuities 222 may be introduced based on bad splicing of optical fiber 220, dirt or other particles in optical fiber 220, bending or pinching of optical fiber 210. A discontinuity loss point may be a location along the optical fiber 220 at which there is a loss of reflected power (i.e., a reduction in Rayleigh backscattering). This may indicate that the optical signal 220 is being obstructed in some manner.

Fiber signal loss event identification device 210 may implement OTDR functions such as measuring fiber attenuation and discontinuous loss events 340. Discontinuous loss events occur in a fiber attenuation curve for an optical fiber when the slope of the fiber attenuation curve, such as fiber attenuation curve 330, shown in FIG. 3, sharply shifts downwards as the quality of data transmission decreases due to defects at the discontinuities of optical fibers. A discontinuous loss event may be defined as a point in a fiber attenuation curve corresponding to a discontinuity in the optical fiber 220 at which optical transmission is reduced.

OTDR plot 300 is a graph of reflected power level 310 (i.e., Rayleigh backscattered return pulses) over the fiber length 320 of the optical fiber 220. The OTDR plot includes a fiber attenuation curve 330 that represents the attenuation of an optical signal that is transmitted through an optical fiber, such as optical fiber 220. Fiber signal loss event identification device 210 may determine fiber attenuation curve 330 by integrating a time that the Rayleigh backscatter is received (from the time of the initial pulse) to determine a location along the fiber length 320 and plotting the reflected power level 310 of the signal at each distance along the optical fiber. Discontinuous loss events 340 (shown by way of example, as discontinuous loss events 340-1 and 340-2) indicate discontinuities 222 in optical fiber 220. Fiber end reflection 350 represents the reflection from the far end of the optical fiber.

Discontinuous loss events 340 caused by different discontinuities 222 may have different characteristics. Fiber signal loss event identification device 210 may identify a type of discontinuity 222 that is causing each discontinuous loss event 340. Discontinuous loss events 340 for optical fiber 220 are often caused by bad fiber splice or bad fiber bending.

Bad fiber splice events may include dirt in the optical fiber 220. At the points at which an obstruction to the optical signal such as dirt is introduced to the optical fiber 220, after that point there may be a large drop in the strength of the return signal because the light has been blocked. Any light reflected back will be attenuated by the dirt.

Bad fiber bending events may include bending or pinching loss at points of the optical fiber 220.

In implementations described herein, fiber signal loss event identification device 210 may identify a type of discontinuity 222 in optical fiber 220. Fiber signal loss event identification device 210 may effectively distinguish a bad fiber bending event from a bad fiber splice event based on different characteristics of reflected power loss from a bent optical fiber and a badly spliced (or blocked) optical fiber. Fiber signal loss event identification device 210 may send the results of the analysis to a device associated with technicians for network 100.

For a bad fiber splice event, manual re-splicing is needed. For a bad fiber bending event, the only action is just to re-arrange the cable to release the bending. Therefore, identifying the cause of the discontinuous events is beneficial to field teams in preparing proper procedures to solve the problems in advance of time. In this disclosure, a method is proposed for identifying bad fiber bending events from bad fiber splice events.

Figure 4:
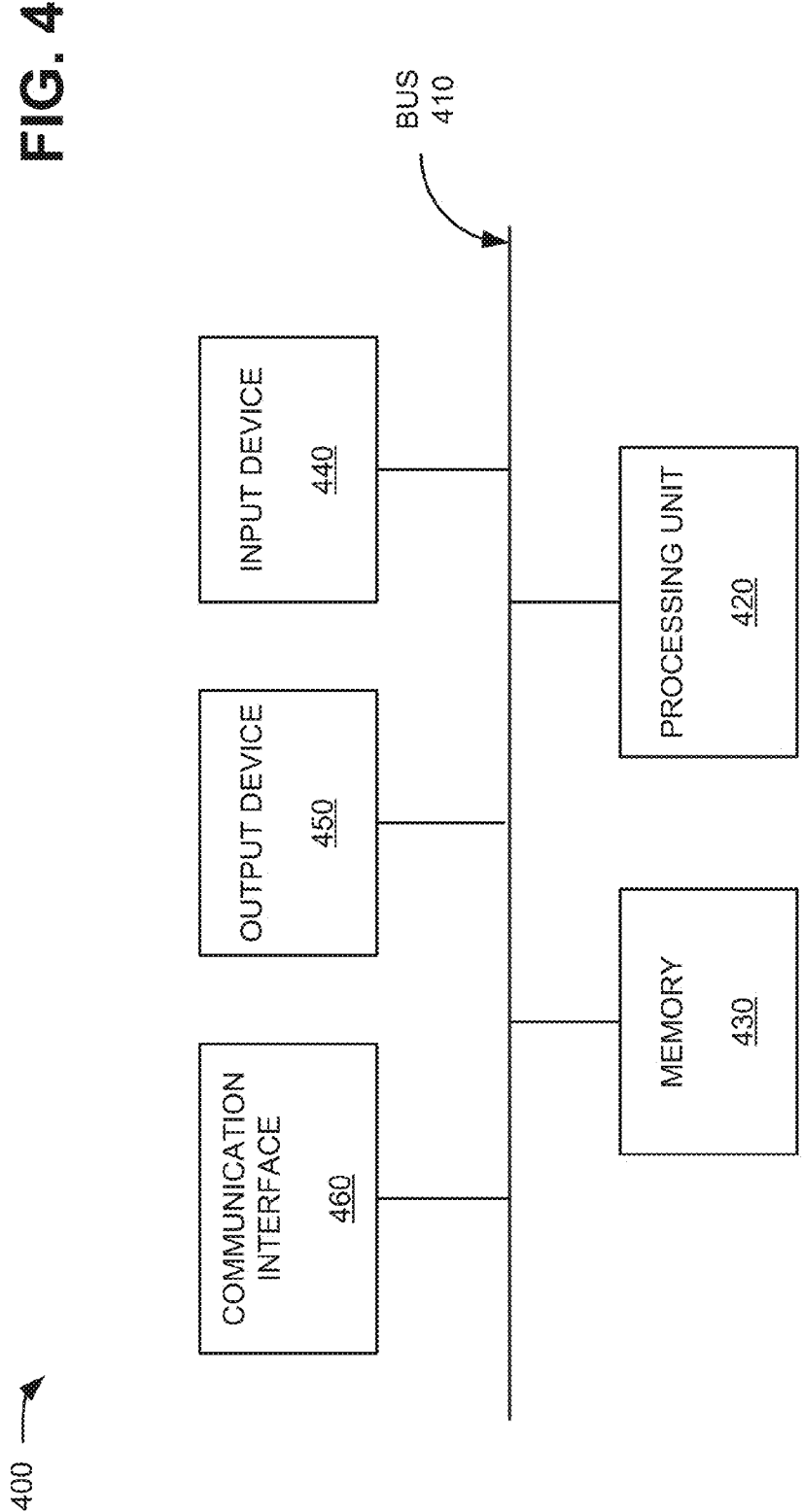
FIG. 4 illustrates exemplary components of one or more of the devices included in the environment of FIG. 1.

FIG. 4 is a diagram of example components of a device 400. Each of optical network 100, metro/regional networks 102 and 104, or edge network 108 may include one or more devices 400. As shown in FIG. 4, device 400 may include a bus 410, a processor 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include a transceiver that enables device 400 to communicate with other devices and/or systems. For example, communication interface 460 may include mechanisms for communicating with other devices, such as other devices of system 100.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
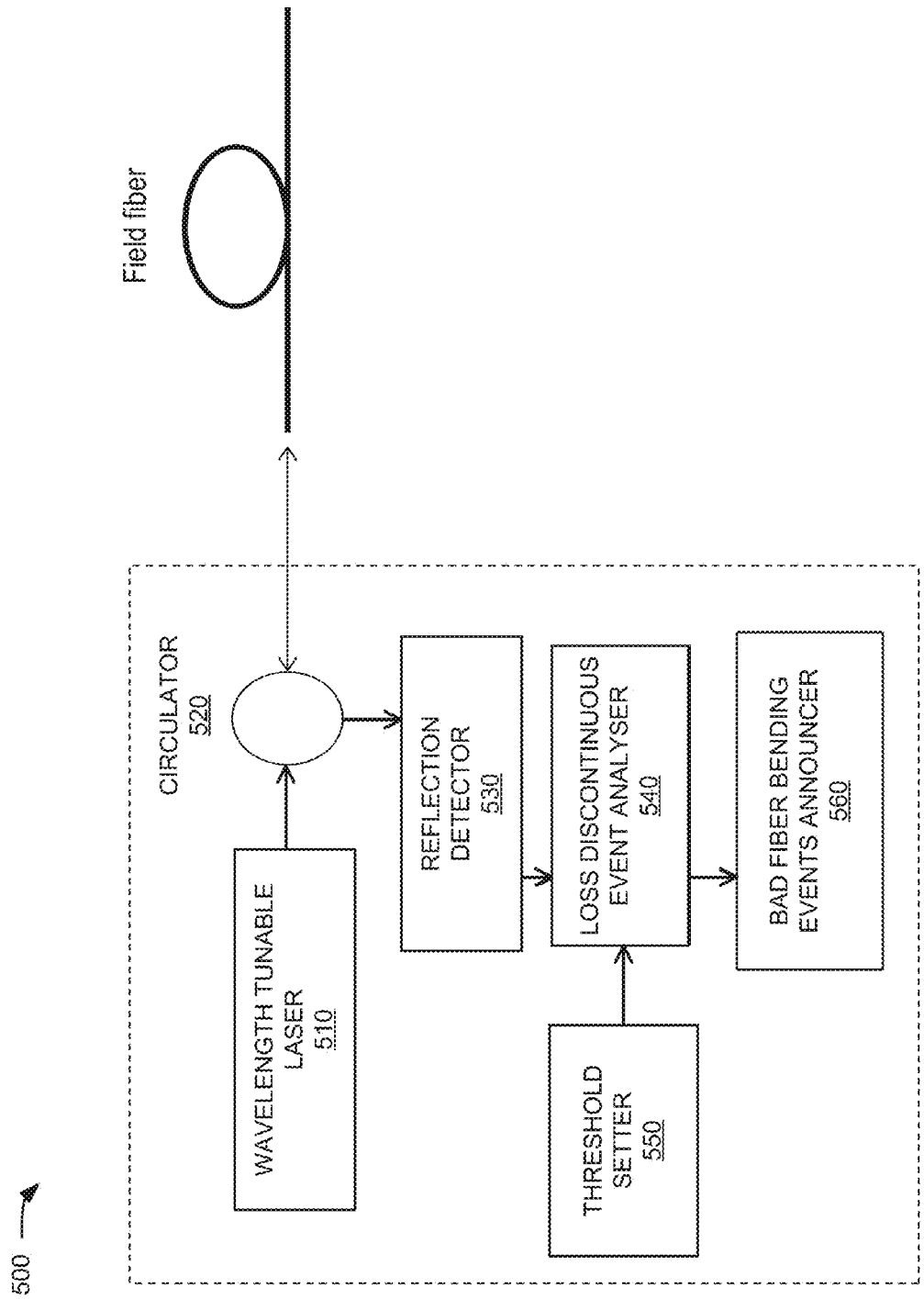
FIG. 5 a functional block diagram of the fiber signal loss event identification device of FIG. 2.

FIG. 5 is a functional block diagram of the fiber signal loss event identification device 210 of FIG. 2. As shown in FIG. 5, fiber signal loss event identification device 210 includes a wavelength tunable laser 510, a circulator 520, a reflection detector 530, a discontinuous loss event analyzer 540, a threshold setter 550 and a bad fiber bending event announcer 560. Fiber signal loss event identification device 210 may be connected to optical fiber 220. Although fiber signal loss event identification device 210 is shown with a particular configuration of components, it should be understood that different configurations of fiber signal loss event identification device 210 may be implemented, with more, fewer, or different components. For example, in one implementation, threshold setter 550 may not be included. In other implementations, components to communicate in real time (not shown) with field technicians for network 100 may be included.

Figure 6:
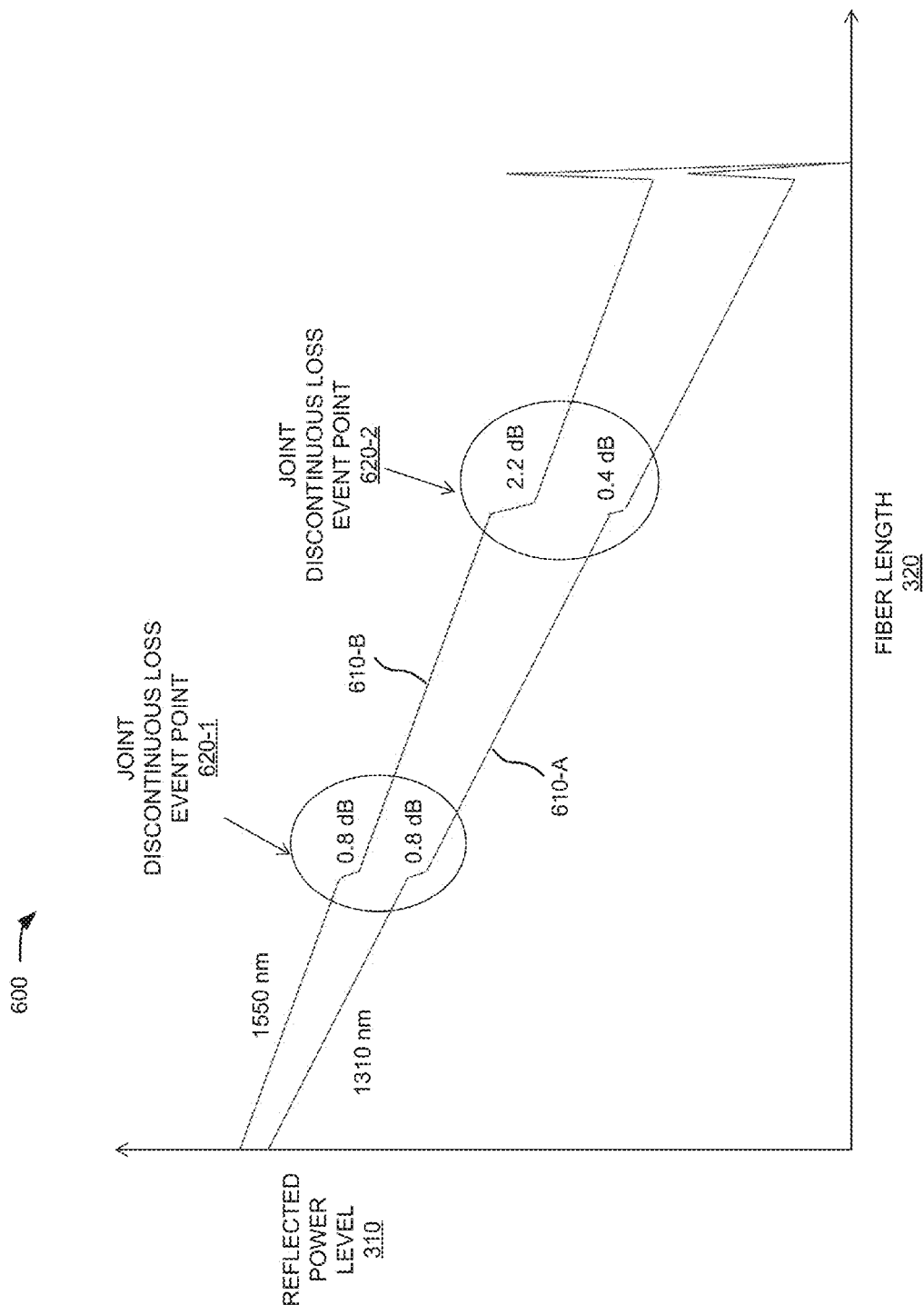
FIG. 6 is an exemplary diagram of OTDR curves measured at different wavelengths for an optical fiber according to implementations described herein.

Wavelength tunable laser 510 may be a tunable laser that is configured to provide pulses of different wavelengths to be sent into a field fiber (i.e., optical fiber 220) that is to be tested to distinguish different discontinuous loss events 340. Wavelength tunable laser 510 may send one pulse with a first wavelength into optical fiber 220 and another pulse with a second, different wavelength into optical fiber 220. Both pulses may produce reflected backscatter that is received by reflection detector 530. Wavelength tunable laser 510 may provide a set number of multiple pulses with different wavelengths. In one example, wavelength tunable laser 510 provides pulses at two wavelengths that generate reflected power corresponding to a fiber attenuation or OTDR curve for each of the two wavelengths, such as shown in FIG. 6 and described hereinbelow.

Circulator 520 is configured to redirect returned optical signals to another output, e.g., toward reflection detector 530. Circulator 520 may amplify the redirected reflection to reflection detector 530. In addition, circulator 520 may also prevent return light from traveling back to wavelength tunable laser 510, thereby protecting these components from damage or interference caused by return optical signals.

Reflection detector 530 may detect reflected pulses (i.e., returned optical signal) from each of the pulses of different wavelength that have been sent into optical fiber 220. Reflection detector 530 may determine a fiber attenuation curve for each of the reflected pulses. For example, reflection detector 530 may detect backscatter from optical signals at two different wavelengths that have been input to optical fiber 220 by wavelength tunable laser 510 and redirected by circulator 520. Reflection detector 530 may determine a first fiber attenuation curve from the first reflected pulse and a second fiber attenuation curve from the second reflected pulse.

In one implementation, reflection detector 530 may include a photodiode (e.g., an indium-gallium-arsenide (InGaAs) or germanium photoconductor) or other sensor configured to detect the optical power of a received signal output from circulator 520 relative to a reference power level, also referred to as a noise floor. The measured optical power represents the backscatter associated with the output optical signal. In one implementation, reflection detector 530 may transmit values indicative of the measured backscatter power along the entire optical fiber 220 (i.e., corresponding to values along the OTDR curve) to discontinuous loss event analyzer 540 for each pulse of particular wavelength input to the optical fiber 220. FIG. 6 is a plot 600 of two backscatter optical power curve 610 over a range of wavelengths, illustrating an exemplary output of reflection detector 530. In another embodiment, reflection detector 530 may only transmit values associated with an identified discontinuous loss event for use in determining the defect characteristics of a particular discontinuous loss event 340. For example, if a particular discontinuous loss event is identified based on OTDR measurements, reflection detector 530 may transmit values before and after the particular discontinuous loss event 340 for analysis based on selection of the particular discontinuous loss event by an end user of fiber signal loss event identification device 210 (e.g., a technician for network 100). The additional values from reflected power along optical fiber 220 may be discarded.

Discontinuous loss event analyzer 540 may receive values corresponding to reflected power levels for pulses with at least two different wavelengths input to optical fiber 220 from reflection detector 530 (i.e., power values for the reflected pulses). Discontinuous loss event analyzer 540 may receive an identification of the discontinuous loss event from the reflection detector 550. Alternatively, discontinuous loss event analyzer 540 may identify a particular discontinuous loss event of reflected power corresponding to a particular distance along the optical fiber 220), and analyze the wavelength dependence of the loss at the discontinuous loss event 340. In one example, discontinuous loss event analyzer 540 may identify a particular discontinuous loss event over an area in the optical fiber based on a reduction of reflected power at a rate that substantially exceeds the rate of loss of reflected power in a fiber attenuation curve of an optical fiber that does not contain discontinuities (or a portion of an optical fiber that does not contain discontinuities). Discontinuous loss event analyzer 540 may determine a slope of the wavelength dependent loss by comparing the power loss at the discontinuous loss event 340 for different wavelengths.

Discontinuous loss event analyzer 540 may identify power loss for at least two different wavelengths at the discontinuous loss event 340. The difference between the power losses for the two wavelengths is a discontinuous loss slope. If the loss is the same for both wavelengths, i.e., discontinuous loss slope is zero, then discontinuous loss event analyzer 540 may identify the discontinuous loss event 340 as a bad splice event.

If the discontinuous loss slope is not zero, discontinuous loss event analyzer 540 may retrieve and/or receive a bad fiber bending slope threshold from threshold setter 550. Alternatively, discontinuous loss event analyzer 540 may store a predetermined bad fiber bending slope threshold. The bad fiber bending slope threshold may be a minimum difference between power loss at a discontinuous event. The bad fiber bending threshold may be selected based on the two wavelengths of the optical pulses input by wavelength tunable laser 510 to optical fiber 220.

Threshold setter 550 may set/provide a bad fiber bending slope threshold that discontinuous loss event analyzer 540 may apply or use in the determination whether the discontinuous loss event 340 is a bad fiber bending event. For example, bad fiber bending slope threshold may indicate that differences less than 1 dB are to be classified as bad fiber splicing events (i.e., not bad fiber bending events) and discarded (or stored elsewhere). In contrast, a 1.5 dB drop in power may be classified as a bad fiber bending event. The bad fiber bending slope threshold may help to filter out noise fluctuations.

According to one implementation, threshold setter 550 may receive feedback from technicians based on actual field results and adjust the bad fiber bending slope threshold according based on incorrectly diagnosed signal discontinuous loss events (e.g., bad fiber splice events incorrectly identified as bad fiber bending events and vice versa).

Referring now back to discontinuous loss event analyzer 540, discontinuous loss event analyzer 540 may apply the bad fiber bending slope threshold to discontinuous loss values (at particular points in optical fiber 220) received for pulses that have two of more different wavelengths. If the discontinuous loss event analyzer 540 determines that the discontinuous loss slope (i.e., difference between discontinuous loss values) is greater than the bad fiber bending slope threshold, discontinuous loss event analyzer 540 may determine that the discontinuous loss event 340 is to be classified as (i.e., is most likely) a bad fiber bending event.

Optical fiber 220 is a waveguide and consequently light loss due to bad fiber bending depends on the wavelength of the light (i.e., optical signal) input by wavelength tunable laser 510. In the telecommunication optical band, loss of reflected power due to bad fiber bending is a monotonic function along wavelength. Longer wavelengths have higher power losses. If the power loss is due to a bent or pinched fiber, different wavelengths of light may have different loss as shown with respect to FIG. 6 hereinbelow. Bad fiber bending, which may be caused by fiber pinching, causes extra power loss in the optical fiber 220 (in addition to the normal attenuation of the optical signal while being transmitted through the optical fiber), so that a discontinuous event appears in an OTDR curve. Discontinuous loss event analyzer 540 may separate bad fiber bending events from bad fiber splice events based on a determination that the discontinuous loss slope between two wavelengths is greater than the bad fiber bending slope threshold.

Bad fiber bending events announcer 560 may store (an indication of) each bad fiber bending event (including, in some instances, a position along optical fiber at which the bad fiber bending event occurs and a magnitude of the power loss at the bad fiber bending event). Bad fiber bending events announcer 560 may store a discontinuous loss slope associated with each bad fiber bending event to be used in quality control (e.g., determine accuracy of analysis and suitability of threshold selected by discontinuous loss event analyzer 540 and threshold setter 550). Bad fiber bending events announcer 560 may also provide result for field technicians associated with a service provider for network 100. The field technicians may be able to prepare their work schedule, approach, or equipment, etc., to unbend, repair, splice, or replace, etc., the optical fiber 220 based on whether a bad fiber bending event or a bad fiber splice event is identified in advance of a time to go to the field (e.g., repair site).

Technicians may prepare their work to solve the problem according to the finding. In this manner, technicians may avoid many unnecessary re-splicing jobs. This may increase efficiency and save costs and time for the operation teams and service provider.

According to one implementation, bad fiber bending events announcer 560 may request and/or receive schematics of surrounding infrastructure (e.g., access points to optical fiber 220) based on a type of discontinuous loss event 340 identified in optical fiber 220. In a further implementation, bad fiber bending events announcer 560 may include a feature to initiate a check of optical fiber 220 for discontinuous loss events based on feedback received that may indicate a discontinuous loss event (e.g., customer reports of a reduced signal, etc.).

FIG. 6 illustrates an OTDR plot 600 of reflected power level 310 to fiber length 320 from an optical fiber 220 for optical signals of multiple wavelengths 610 (shown as wavelengths 610-A and 610-B). Wavelength 610-A is shown as 1310 nanometers (nm) and wavelength 610-B is shown as 1550 nm by way of example.

As shown in FIG. 6, two OTDR curves may be generated for different light wavelengths (i.e., different colored optical signals 610). Two joint discontinuous loss event points 620 (shown as joint discontinuous loss event point 620-1 and joint discontinuous loss event point 620-2) are observed in the optical signals 610. The joint discontinuous loss event points correspond to power loss for optical signals of multiple different wavelengths observed (via Rayleigh backscatter) from a same point in optical fiber 220.

In instances in which a discontinuous loss event 340 is caused by a bad splicing event (e.g., dirt in the optical fiber 220), optical signals of 610 different wavelengths may receive the same attenuation of power (i.e., the dirt blocks all light equally). Joint discontinuous loss event point 620-1 illustrates one such instance. The power loss observed for both optical signals 610-A and 610-B is observed as 0.8 db. The same drop in power indicates a bad splicing event, which may result from dirty connectors. The discontinuous loss event 340 in this instance is not wavelength dependent.

In instances in which a discontinuous loss event 340 is caused by a bad bending event (i.e., a wavelength dependent event), optical signals 610 of different wavelengths may experience different levels of attenuation of power. The change in attenuation of power for different wavelengths may be deduced or determined to be wavelength dependent (e.g., not due to the property of dirty connectors). The power loss observed for optical signals 610-A is 0.4 dB while the power loss observed for optical signal 610-B is 2.2 dB. The difference in power loss of 1.9 dB may indicate different attenuation of the different optical signals 610. The different attenuation of optical signals 610 of different wavelengths is as a result of the manner in which light travels through an optical fiber. Longer wavelengths are more easily impeded when the optical fiber 220 turns sharply or is pinched (analogous to two cars of different lengths going through narrow twisting streets with the longer car (i.e., longer wavelength) having greater difficulty maneuvering through the streets).

Figure 7:
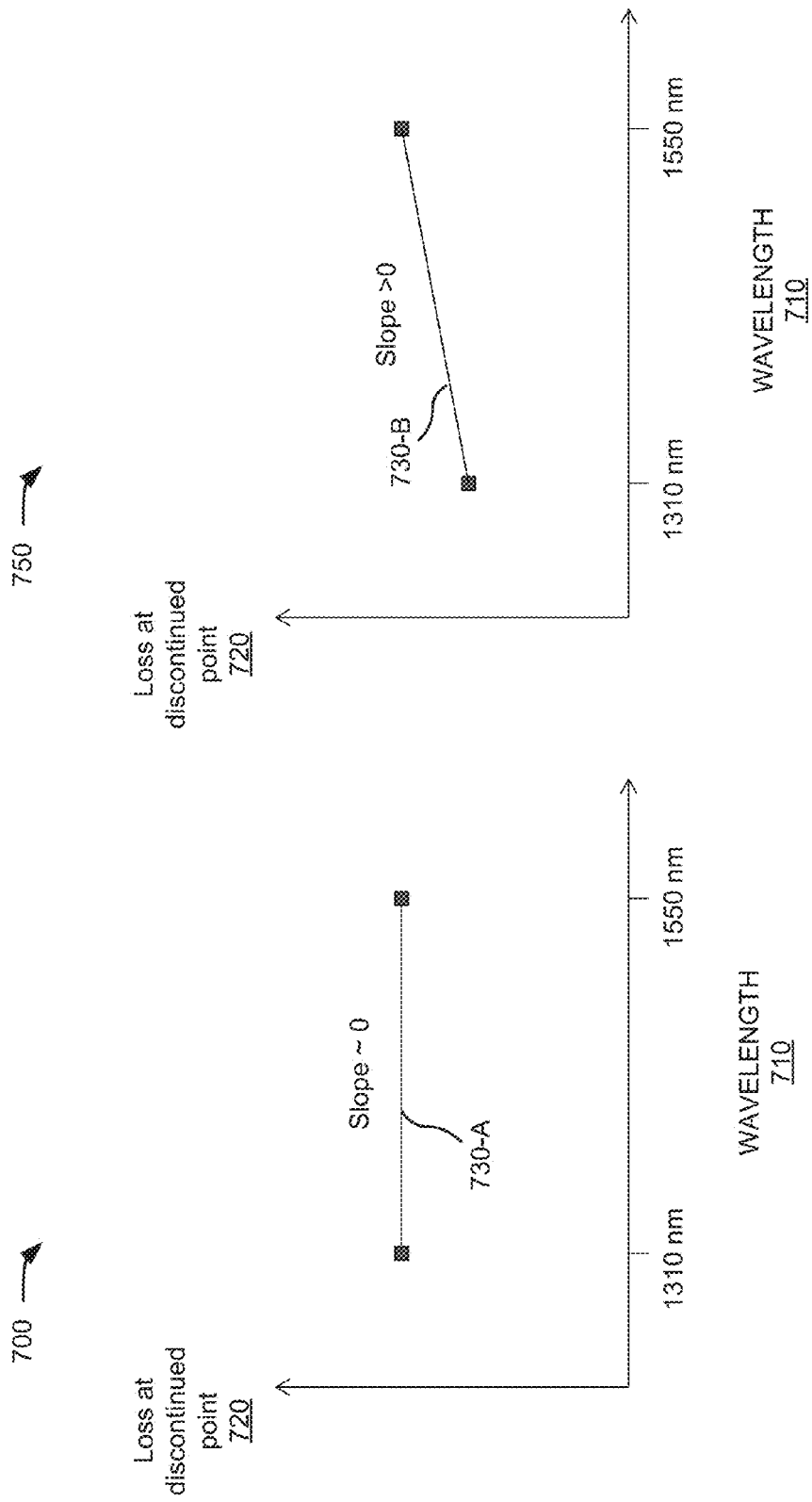
FIGS. 7A and 7B illustrate exemplary signal loss slopes associated with a discontinuity event according to implementations described herein.

FIGS. 7A and 7B illustrate discontinuity loss plots 700 and 750 respectively of wavelength 710 of the different optical signal to loss at a discontinued point 720. Discontinuity loss slopes 730 (discontinuity loss slopes 730-A and 730-B, respectively, shown in FIGS. 7A and 7B) may correspond to the optical signals of different wavelengths at joint discontinuous event points 620-1 and 620-2, respectively, described above with respect to FIG. 6.

As shown in FIG. 7A, the discontinuity loss slope 730-A from the power loss at discontinued point 720 for an optical signal of wavelength 1310 nm to an optical signal of 1550 nm is approximately zero. The difference between losses for the optical signals of different wavelengths is approximately zero for two different wavelengths. The power loss in this instance is not wavelength dependent. This indicates that the discontinuous loss event 340 is probably not a bad fiber bending event.

As shown in FIG. 7B, the discontinuity loss slope 730-B is greater than zero. In this instance, the discontinuous loss event may be a bad fiber bending event. However, in some instances, there may be a difference in power loss for the two wavelengths because of noise, fluctuations, etc. A bad fiber bending slope threshold may be applied (e.g., by fiber signal loss event identification device 210) to determine whether the discontinuity loss slope 730-B indicates a bad fiber bending event. The bad fiber bending threshold is a predetermined threshold above which the power loss difference between two wavelengths is presumed to be due to a bad fiber bending event.

Figure 8:
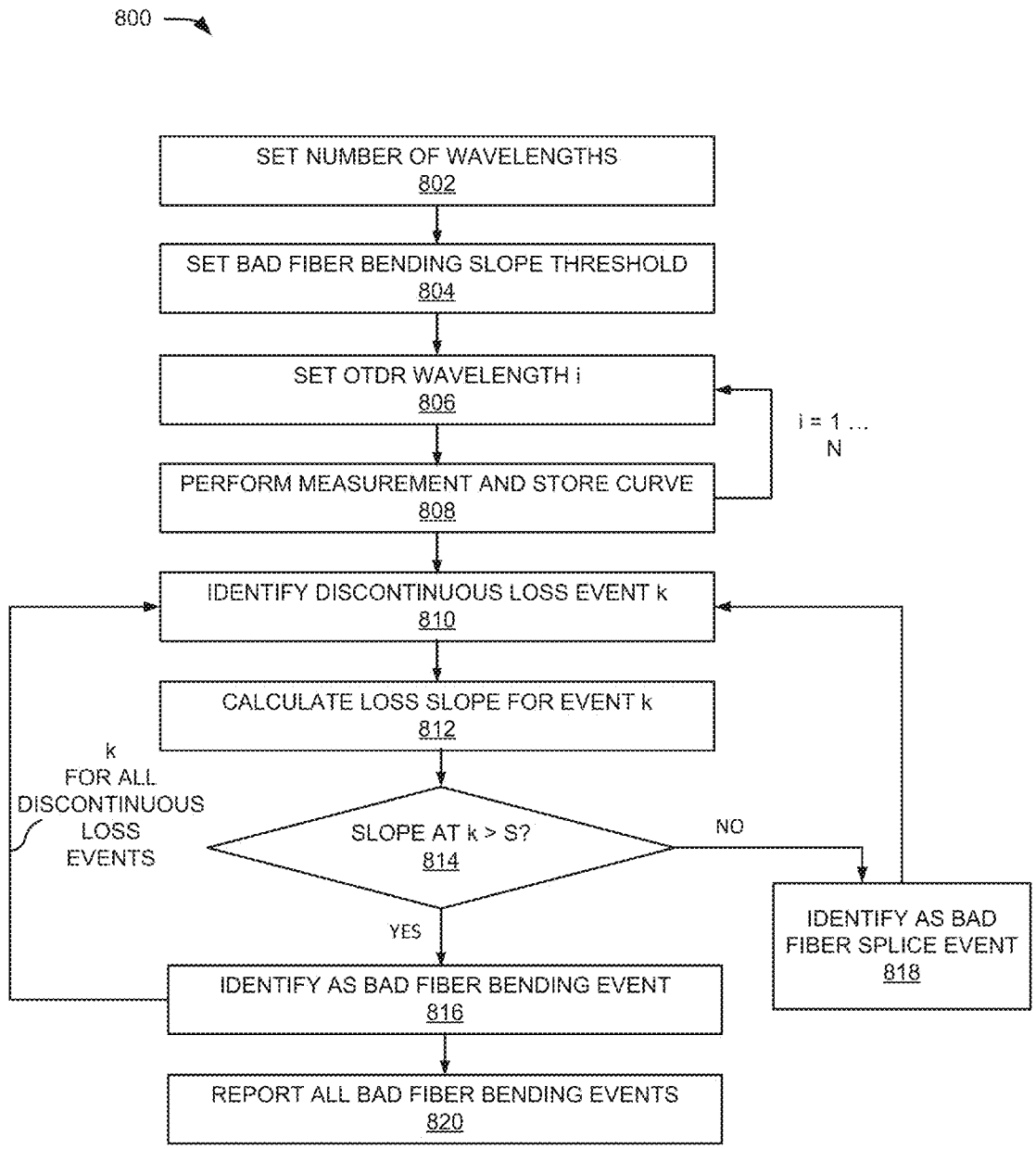
FIG. 8 is a flow diagram of an exemplary process for identifying a signal loss event in an optical fiber according to implementations described herein.

FIG. 8 is a flow diagram of an exemplary process 800 for identifying a signal loss event in an optical fiber. In one implementation, the process of FIG. 8 may be performed by fiber signal loss event identification device 210. In other implementations, some or all of the process of FIG. 8 may be performed by another device or a group of devices separate from fiber signal loss event identification device 210 and/or including fiber signal loss event identification device 210.

At block 802, fiber signal loss event identification device 210 may set a number of wavelengths to be used. For example, fiber signal loss event identification device 210 (or a controller in fiber signal loss event identification device 210) may set a number of wavelengths of different optical signals to be used to be two. Alternatively, fiber signal loss event identification device 210 may set the number of wavelengths to be more than two.

At block 804, fiber signal loss event identification device 210 may set a bad fiber bending slope threshold for determining bad fiber bending events. For example, fiber signal loss event identification device 210 may set bad fiber bending slope threshold based on a predetermined expected difference between power losses for optical signals of different wavelengths. Alternatively, fiber signal loss event identification device 210 may determine the bad fiber bending slope threshold based on feedback and observed results for inaccurate detection of the characteristics of discontinuous loss events 340.

Fiber signal loss event identification device 210 may set an OTDR wavelength for each of a predetermined number of wavelengths (e.g., for OTDR wavelength i to OTDR wavelength N, where N is a maximum integer number of wavelengths and i is any integer from 1 to N) (block 806). Fiber signal loss event identification device 210 may perform OTDR measurement for the Rayleigh backscatter and store the fiber attenuation curve 330 (block 808). Fiber signal loss event identification device 210 may perform multiple OTDR measurements at each wavelength and average the measurements at each particular wavelength to control for noise, fluctuations, etc. The process at blocks 806 to 808 may be repeated for each of 1-N wavelengths. The wavelengths may be selected over different ranges of length between the different wavelengths. The difference between wavelengths may also be adjusted based on feedback.

Fiber signal loss event identification device 210 may identify a discontinuous loss event k (block 810). For example, fiber signal loss event identification device 210 may identify instances along an OTDR curve (or fiber attenuation curve) for the optical fiber at which there are changes (i.e., decreases along the fiber attenuation curve) in power over a predetermined maximum distance and a particular threshold value or percentage. Fiber signal loss event identification device 210 may identify a discontinuity loss point that corresponds to the discontinuous loss event (i.e., a position along optical fiber 220 at which the discontinuous loss event occurs).

Fiber signal loss event identification device 210 may calculate a slope loss along the optical fiber 220 for event an identified event (e.g., event k) (block 812). For example, fiber signal loss event identification device 210 may determine a slope loss from an optical signal with (i.e., having) a first wavelength to an optical signal with a second wavelength that is different from the first wavelength at a discontinuity loss point.

Fiber signal loss event identification device 210 may check whether the slope at event k is greater than a bad fiber bending slope, using equation 1 below:

$$\text{if } k_S > S, \text{ then } k = \text{bad fiber bending event} \qquad \text{(Eqn. 1)}$$

where $k_S$ is a slope at event k, and S is a minimum bad fiber bending slope.

If the slope at k is greater than the minimum bad fiber bending slope (block 814—yes), fiber signal loss event identification device 210 may mark, index, store, or record the event as a bad fiber bending event (816). In other words, if the gradient of the slope at k is greater than the gradient of the minimum bad fiber bending slope, fiber signal loss event identification device 210 may identify the event as a bad fiber bending event.

If the slope at k is greater than a minimum bad fiber bending slope (block 814—no), fiber signal loss event identification device 210 may mark, index, store or record the event as a bad fiber splice event (i.e., a non-bad fiber bending event) (818). The series of blocks 810 through 818 is a sub-process of process 800 that may repeat for all identified discontinuous loss events.

Fiber signal loss event identification device 210 may report all bad fiber bending events (block 820). For example, fiber signal loss event identification device 210 may output the bad fiber bending events to a device associated with a technician for network 100.

Systems and/or methods described herein may identify a type of discontinuous loss event. Although embodiments are described with respect to bad fiber bending events and bad fiber splicing events, the principles included herein may be applied to differentiate other events in optical fibers that have different measurable responses over a range of wavelengths for Rayleigh backscattering.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
   a wavelength tunable laser to provide a first optical pulse of a first wavelength and a second optical pulse of a second wavelength to an optical fiber of a telecommunications network;
   a reflection detector to:
      receive the first reflected pulse and the second reflected pulse, and
      determine a first fiber attenuation curve from the first reflected pulse and a second fiber attenuation curve from the second reflected pulse; and
   a discontinuous loss event analyzer to:
      identify a discontinuous loss event at a discontinuous loss point in at least one of the first fiber attenuation curve and the second first fiber attenuation curve,
      determine a return loss slope based on a return loss at the discontinuous loss point for the first fiber attenuation curve and a return loss at the discontinuous loss point for the second first fiber attenuation curve, and
      determine whether the discontinuous loss event is a bad fiber bending event based on the return loss slope.

2. The system of claim 1, wherein, when determining whether the event is a bad fiber bending event, the discontinuous loss event analyzer is further to:
   determine whether the return loss slope is greater than zero.

3. The system of claim 1, further comprising:
   a threshold setter to provide a minimum bad fiber bending slope; and wherein, when determining whether the event is a bad fiber bending event, the discontinuous loss event analyzer is further to:
    determine whether the return loss slope is greater than the minimum bad fiber bending slope.

4. The system of claim 3, wherein, when determining whether the event is a bad fiber bending event, the discontinuous loss event analyzer is further to apply:

if $k_S > S$, then k=bad fiber bending event, wherein $k_S$ is a slope at event k, and S is a minimum bad fiber bending slope.

5. The system of claim 3, wherein, when providing the minimum bad fiber bending slope, the threshold setter is further configured to:
    adjust minimum bad fiber bending slope based on feedback.

6. The system of claim 1, wherein the discontinuous loss event analyzer is further configured to:
    determine that the discontinuous loss event is a bad splice event if the return loss slope is approximately equal to zero.

7. The system of claim 1, further comprising:
    a bad fiber event announcing device to provide at least one report of a bad fiber event to a device associated with a field technician for the optical fiber.

8. The system of claim 7, wherein the bad fiber event announcing device is further configured to:
    request schematics of surrounding infrastructure based on the discontinuous loss event; and
    provide the schematics of the surrounding infrastructure to the device associated with the field technician.

9. The system of claim 1, further comprising a circulator configured to:
    amplify the first reflected pulse and the second reflected pulse.

10. The system of claim 1, wherein the wavelength tunable laser is further configured to:
    provide at least one additional optical pulse of at least one additional wavelength.

11. The system of claim 1, wherein, when identifying the discontinuous loss event, the discontinuous loss event analyzer is further configured to:
    receive an identification of the discontinuous loss event from the reflection detector.

12. A system comprising:
    a wavelength tunable laser to provide a plurality of optical pulses that include a plurality of different wavelengths to at least one optical fiber of a telecommunications network;
    a circulator to redirect reflected pulses from each of the plurality of optical pulses;
    a reflection detector configured to:
        receive the reflected pulses, and
        determine a plurality of fiber attenuation curves from the reflected pulses;
    a threshold setter configured to provide a minimum bad fiber bending slope; and
    a discontinuous loss event analyzer configured to
        identify a discontinuous loss event at a discontinuous loss point in at least one of the plurality of fiber attenuation curves,
        determine a return loss slope based on a return loss at the discontinuous loss point for each of the plurality of fiber attenuation curves, and
        determine whether the discontinuous loss event is a bad fiber bending event based on the return loss slope and the minimum bad fiber bending slope.

13. The system of claim 12, further comprising:
    a controller configured to set at least one of a number of the plurality of optical pulses or a wavelength of each of the plurality of optical pulses.

14. The system of claim 12, wherein, when providing the minimum bad fiber bending slope, the threshold setter is further configured to:
    adjust minimum bad fiber bending slope based on feedback.

15. The system of claim 12, wherein, when identifying the discontinuous loss event, the discontinuous loss event analyzer is further configured to:
    identify instances along at least one of the plurality of fiber attenuation curves at which there are changes in power over a predetermined maximum distance and a particular threshold percentage.

16. The system of claim 12, wherein, when providing the minimum bad fiber bending slope, the threshold setter is further configured to:
    adjust minimum bad fiber bending slope based on feedback received from at least one of technicians or customers.

17. The system of claim 12, wherein the discontinuous loss event analyzer is further configured to:
    determine that the discontinuous loss event is a bad splice event if the return loss slope is approximately equal to zero.

18. A computer implemented method comprising:
    setting a bad fiber bending threshold for determining a bad fiber bending event in an optical fiber of a telecommunications network;
    setting at least two wavelengths for optical pulses to be input to the optical fiber;
    sending at least one optical pulse at each of the at least two wavelengths into the optical fiber;
    performing an optical time domain-reflectometer (OTDR) measurement to determine a fiber attenuation curve for each of the at least two wavelengths;
    identifying a discontinuous loss event based on at least one of the fiber attenuation curve for each of the at least two wavelengths;
    calculating a loss slope along the at least two wavelengths of the optical pulses;
    determining whether the slope at the discontinuous loss event is greater than the bad fiber bending threshold; and
    marking the discontinuous loss event as a bad fiber bending event in response to a determination that the slope at the discontinuous loss event is greater than the bad fiber bending threshold.

19. The system of claim 18, further comprising:
    reporting the bad fiber bending event to a device associated with a service provider for the optical fiber.

20. The system of claim 18, further comprising:
    determining that the discontinuous loss event is a bad splice event if the return loss slope is approximately equal to zero.

* * * * *